United States Patent
Namgoong et al.

(10) Patent No.: US 11,194,376 B2
(45) Date of Patent: Dec. 7, 2021

(54) MOBILE DEVICE WITH SENSOR HUB AND METHOD FOR CONTROLLING THE DEVICE

(71) Applicant: Samsung Electronics Co., Ltd., Suwon-si (KR)

(72) Inventors: Boram Namgoong, Seoul (KR); Juntaek Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 15/964,964

(22) Filed: Apr. 27, 2018

(65) Prior Publication Data

US 2018/0246559 A1   Aug. 30, 2018

Related U.S. Application Data

(63) Continuation of application No. 13/940,919, filed on Jul. 12, 2013, now abandoned.

(30) Foreign Application Priority Data

Jul. 18, 2012   (KR) .................. 10-2012-0078303

(51) Int. Cl.
  *G06F 1/3206* (2019.01)
  *G06F 1/3215* (2019.01)
  (Continued)

(52) U.S. Cl.
  CPC ............ *G06F 1/3215* (2013.01); *G06F 1/325* (2013.01); *G06F 1/3206* (2013.01); *G06F 1/3293* (2013.01); *Y02D 10/00* (2018.01)

(58) Field of Classification Search
  CPC ....... G06F 1/3215; G06F 1/3206; G06F 1/325; G06F 1/3293; Y02D 10/00
  See application file for complete search history.

(56) References Cited

U.S. PATENT DOCUMENTS 7,796,096 B2   9/2010   Shim et al.
8,451,239 B2   5/2013   Chen
(Continued)

FOREIGN PATENT DOCUMENTS

CN   101105712 A   1/2008
CN   101458557 A   6/2009
(Continued)

OTHER PUBLICATIONS

Korean Office Action with English translation dated Sep. 27, 2018; Korean Appln. No. 10-2012-0078303.
(Continued)

*Primary Examiner* — Gary Collins
(74) *Attorney, Agent, or Firm* — Jefferson IP Law, LLP (57) ABSTRACT

A mobile device with a sensor hub and sensors and a method for controlling the mobile device are provided. The method includes receiving state information regarding the mobile device, setting a sensor sampling period based on the received state information, and receiving measured values from one or more sensors according to the set, sensor sampling period. The sensor hub receives the state information regarding the mobile device, sets a sensor sampling period based on the received state information, and receives measured values from one or more sensors according to the set sensor sampling periods. The mobile device controls the sensors via the sensor hub irrespective of the operations of the main processor. The sensor hub sets a sensor sampling period based on the received state values of a mobile device.

20 Claims, 5 Drawing Sheets

(51) Int. Cl.
*G06F 1/3234* (2019.01)
*G06F 1/3293* (2019.01)

(56) References Cited

U.S. PATENT DOCUMENTS

| | | |
|---|---|---|
| 9,383,867 B2 | 7/2016 | Hirakawa et al. |
| 2003/0122810 A1* | 7/2003 | Tsirkel .................... G09G 3/20 345/207 |
| 2007/0097065 A1* | 5/2007 | Kreek ................... G06F 1/1626 345/102 |
| 2008/0234935 A1 | 9/2008 | Wolf et al. |
| 2010/0141399 A1* | 6/2010 | Swope .............. H04M 1/72454 340/10.33 |
| 2010/0302028 A1 | 12/2010 | Desai et al. |
| 2010/0313050 A1 | 12/2010 | Harrat et al. |
| 2011/0077865 A1* | 3/2011 | Chen .................... G06F 1/3215 702/3 |
| 2011/0080367 A1 | 4/2011 | Marchand et al. |
| 2011/0102451 A1* | 5/2011 | Broga .................. G09G 3/3406 345/589 |
| 2011/0215903 A1 | 9/2011 | Yang et al. |
| 2012/0096288 A1* | 4/2012 | Bates .................... G06F 1/3206 713/320 |
| 2012/0100895 A1 | 4/2012 | Priyantha et al. |
| 2012/0218282 A1* | 8/2012 | Choboter ................. G09G 5/00 345/589 |
| 2012/0254878 A1 | 10/2012 | Nachman et al. |
| 2012/0280917 A1 | 11/2012 | Toksvig et al. |
| 2013/0080811 A1 | 3/2013 | Low et al. |
| 2014/0156269 A1 | 6/2014 | Lee et al. |
| 2015/0346799 A1 | 12/2015 | Sengupta et al. |

FOREIGN PATENT DOCUMENTS

| | | |
|---|---|---|
| CN | 101866210 A | 10/2010 |
| KR | 10-2011-0133283 A | 12/2011 |
| KR | 10-2011-0134527 A | 12/2011 |
| KR | 10-2012-0011085 A | 2/2012 |
| WO | 2011-055534 A1 | 5/2011 |

OTHER PUBLICATIONS

Korean Office Action with English translation dated Oct. 30, 2019; Korean Appln. No. 10-2012-0078303.

* cited by examiner

MOBILE DEVICE WITH SENSOR HUB AND METHOD FOR CONTROLLING THE DEVICE

PRIORITY

This application is a continuation application of prior application Ser. No. 13/940,919, filed on Jul. 12, 2013, which claimed the benefit under 35 U.S.C. § 119(a) of a Korean patent application filed on Jul. 18, 2012 in the Korean Intellectual Property Office and assigned Serial No. 10-2012-0078303, the entire disclosure of which is hereby incorporated by reference.

BACKGROUND OF THE INVENTION

1. Field of the Invention

The present invention relates to a mobile device with a sensor hub for controlling sensors and a method for controlling the mobile device. More particularly, the present invention relates to a technology for setting a sensor sampling period based on state information regarding a mobile device via a sensor hub.

2. Description of the Related Art

Mobile devices with sensors according to the related art typically do not include separate processors for controlling the sensors. Accordingly, when the mobile devices enter into a sleep mode, a main processor must control the sensors. This, however, increases the load of the main processors and thus deteriorates the control performance for the sensors.

In order to measure the states of the mobile devices in sleep mode via the sensors, the main processors must perform a wake-up operation. This, however, increases the total overhead of the system.

If the main processor of a mobile device is set to have a relatively short wake-up period to rapidly measure the state values of the mobile device via sensors, power consumption increases. On the other hand, if the main processor of a mobile device is set to have a relatively long wake-up period in order to reduce power consumption, the main processor cannot acquire proper state values of the mobile device via sensors.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a mobile device that includes a sensor hub for controlling sensors and sets the sensor sampling period based on state values of the mobile device, thereby reducing power consumption and increasing use convenience.

In accordance with an aspect of the present invention, a method for controlling a mobile device with a sensor hub and one or more sensors, via the sensor hub is provided. The method includes receiving state information regarding the mobile device, setting a sensor sampling period based on the received state information, and receiving measured values from one or more sensors according to the set sensor sampling period.

In accordance with another aspect of the invention, a mobile device is provided. The device includes one or more sensors for measuring state information of the mobile device, and a sensor hub for controlling one or more sensors. The sensor hub receives the state information regarding the mobile device, sets a sensor sampling period based on the received state information, and receives measured values from one or more sensors according to the set sensor sampling periods.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the drawings represent an exemplary embodiment of the invention, the drawings are not necessarily to scale and certain features may be exaggerated or omitted in order to better illustrate and explain the invention. The same reference numbers are used throughout the drawings to refer to the same or similar parts.

In the following description, a mobile device with a sensor hub and a method for controlling the mobile device according to exemplary embodiments of the present invention are explained with reference to the accompanying drawings.

Figure 1:
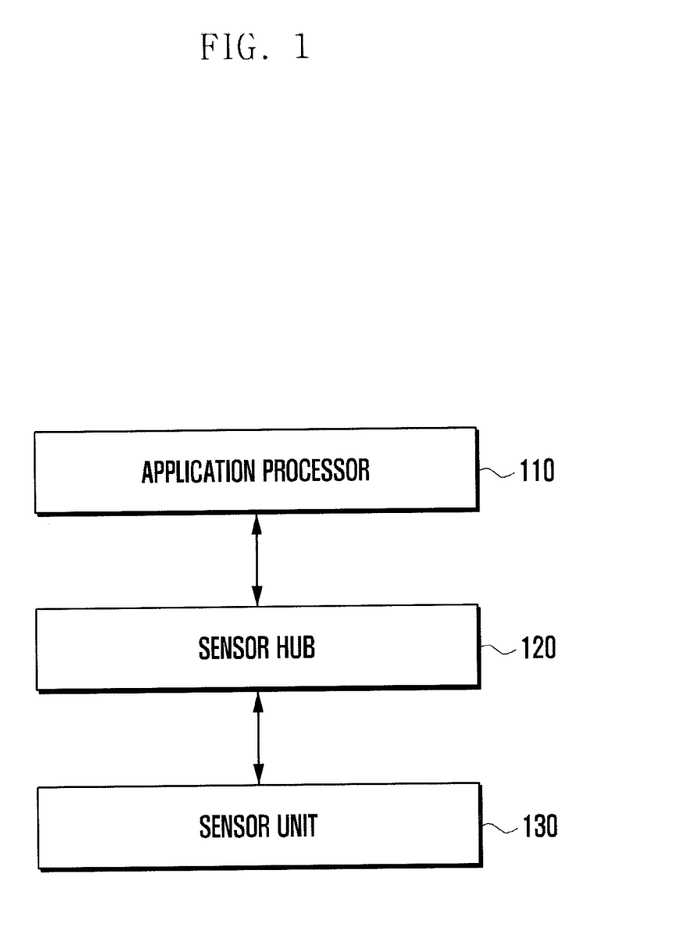
FIG. 1 illustrates a schematic block diagram showing a mobile device according to an exemplary embodiment of the present invention.

FIG. 1 illustrates a schematic block diagram showing a mobile device according to an exemplary embodiment of the present invention.

Referring to FIG. 1, the mobile device 100 includes an Application Processor (AP) 110, a sensor hub 120 and a sensor unit 130.

The AP 110 may serve as a main processor for controlling the mobile device 100. The main processor may include a micro-processor. The AP 110 controls the components in the mobile device 100. The AP 110 controls one or more sensors included in the sensor unit 130 to measures state values of the mobile device 100 and receives the state values via the sensor hub 120.

The AP 110 operates the mobile device 100 in sleep mode in order to reduce electric power consumption. In sleep mode, the AP 110 operates the mobile device 100 to consume a minimum amount of power. The AP 110 activates the mobile device 100 from sleep mode to normal mode when the AP 110 receives external input signals, such as a user's input signal or a wake-up signal that other components of the mobile device 100 receive.

The activation of the mobile device 100 from sleep mode to normal mode is called a wake-up operation and the state is called a wake-up state. A signal for altering the sleep state of the mobile device 100 to the wake-up state, input externally the AP 110, is called a wake-up signal.

Examples of a wake-up signal include a signal for controlling the AP 110 to execute a wake-up operation, information regarding one or more states of the mobile device 100, and the like. In order to operate the mobile device 100 in sleep mode and wake up the mobile device 100, the AP 110 may further include a part that operates in sleep mode, consuming a low amount of electric power.

In another exemplary embodiment, the mobile device 100 is implemented with a mobile communication component including, for example, a Call Processor (CP). In that case, if the AP is in a sleep state and the CP receives a call, the CP may transfer a wake-up signal including the notification of the call reception to the AP.

When the AP 110 wakes up and operates in normal mode, the AP 110 sets the operation mode based on information regarding one or more states of the mobile device included in the received wake-up signal.

For example, the wake-up signal includes information regarding the luminance in the surrounding environment of the mobile device 100, measured via the sensor unit 130. The AP 110 sets a level of brightness for a display of the mobile device 100, based on the received luminance information. For example, if the mobile device 100 is used under bright ambient lighting, the AP 110 operates the display, increasing the level of brightness. If the mobile device 100 is used under dark ambient lighting, the AP 110 operates the display, reducing the level of brightness, thereby reducing power consumption.

Alternatively, the wake-up signal includes information regarding noise in the surrounding environment of the mobile device 100, measured via the sensor unit 130. The AP 110 sets a level of volume for a speaker of the mobile device 100, based on the received noise information. For example, if the mobile device 100 is used in an environment with a high level of noise, the AP 110 sets the speaker to a relatively high level of volume based on the received noise information.

The sensor hub 120 is operated under the control of the AP 110. The sensor hub 120 may operate in wake-up mode while the AP 110 operates in sleep mode. The sensor hub 120 controls the sensor unit 130 including one or more sensors and receives measurement values of the sensors.

The sensor hub 120 is used to control the sensor unit 130 by the AP 110, irrespective of the AP's load. The sensor hub 120 is designed to operate while consuming a low amount of electric power. Since the sensor hub 120 can operate while the AP operates in sleep mode, the sensor hub 120 can also control the sensor unit 130 to consume a low amount of electric power. The sensor hub 120 can control one or more sensors included in the sensor unit 130, respectively.

The sensor hub 120 may operate in sleep mode or wake-up mode. The sensor hub 120 operates in sleep mode by consuming a lower amount of electric power than in normal mode. The sensor hub 120 may operate only a part for receiving a signal for performing a wake-up operation or a part for calculating a wake-up period. This can reduce the amount of electric power required to operate the sensor hub 120. In a wake-up state, the sensor hub 120 operates in normal mode in a similar fashion as the AP 110 and sensor unit 130.

When the AP enters sleep mode, the sensor hub 120 can also operate in sleep mode. While the sensor hub 120 is operating in sleep mode, the sensor hub 120 can perform a sampling operation for the sensor unit 130 in every preset period. This can reduce electric power consumption in the system. The preset period is hereinafter referred to as a sensor sampling period.

The sensor hub 120 may set the sensor sampling period to different values according to the state values of the mobile device 100. If the frequency of the user's inputs to the mobile device 100 is relatively small, the sensor sampling period may be set to a relatively large value, and this reduces electric power consumption.

For example, if a mobile device with an alarm function is set to operate the sleep wake-up function, the sensor hub 120 may perform a sensor sampling function in a relatively larger sensor sampling period. Examples of the sensor sampling period include 10 ms, 20 ms, 60 ms, 200 ms, etc, or a certain value between 5 ms and 1000 ms. The sensor hub 120 may perform a sampling operation more frequently as a preset alarm time approaches. The sensor hub 120 may set the sensor sampling period according to the number of measured values from the sensor unit 130. The sensor hub 120 may set the frequency of measured values that the sensor hub 120 needs based on the state values measured via the sensor unit 130 or the values input via the AP 110.

According to an exemplary embodiment of the present invention, the AP 110 may be implemented as a one-chip processor including the sensor hub 120. The sensor hub 120 may be implemented as a component of the AP 110. In that case, the sensor hub may operate in operation mode while the AP 110 operates in sleep mode. If the sensor hub receives a preset signal, it may transfer it as a wake-up signal to the AP.

Figure 2:
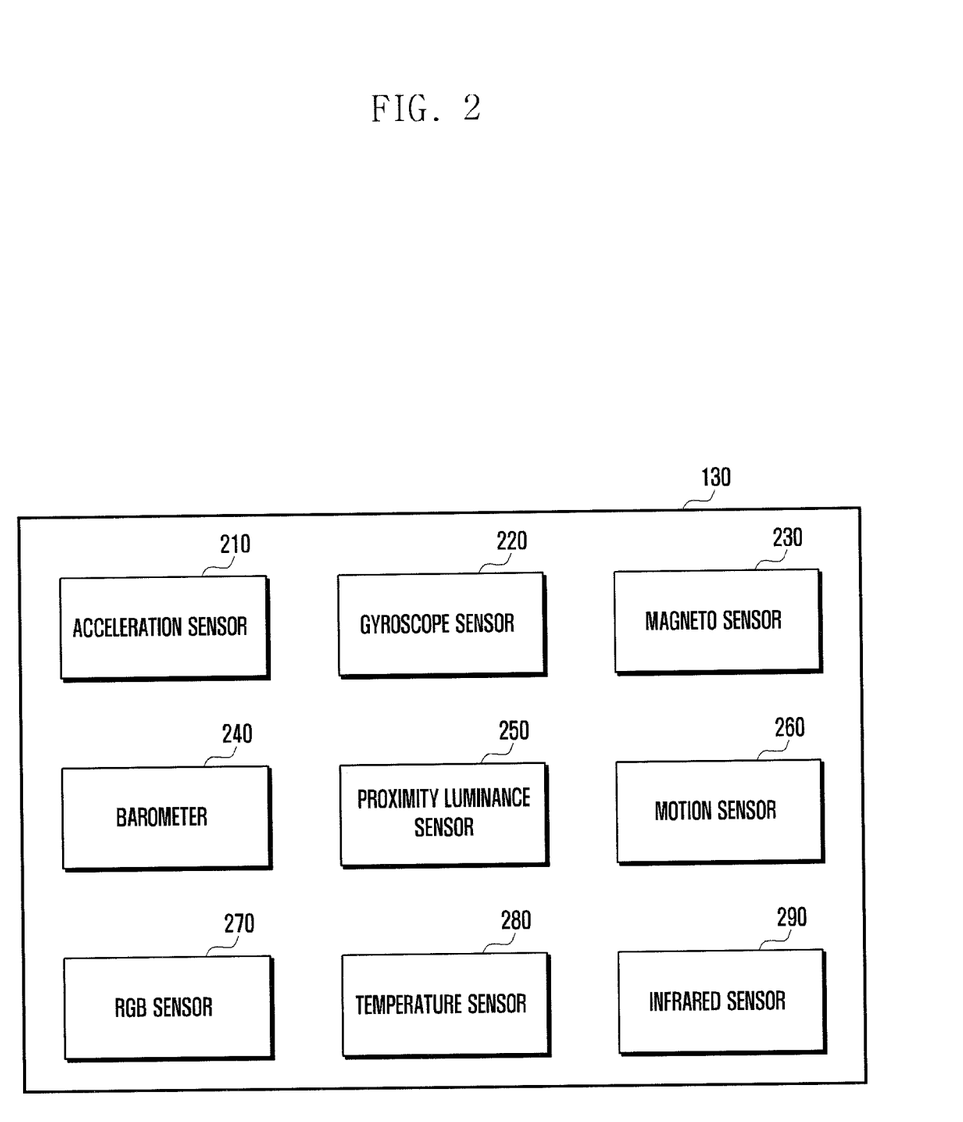
FIG. 2 illustrates a detailed view showing a sensor unit according to an exemplary embodiment of the present invention.

FIG. 2 illustrates a detailed view showing a sensor unit according to an exemplary embodiment of the present invention.

Referring to FIG. 2, the sensor unit 130 includes one or more sensors, such as an acceleration sensor 210, a gyroscope sensor 220, a magneto sensor 230, a barometer 240, a proximity luminance sensor 250, a motion sensor 260, a Red-Green-Blue (RGB) sensor 270, a temperature sensor 280, an infrared sensor 290, and the like.

The acceleration sensor 210 measures the acceleration of the mobile device 100.

The gyroscope sensor 220 detects three-dimensional motion of the mobile device 100.

If a sensor sampling period has elapsed, and a value corresponding to the motion of the mobile device 100, measured via the acceleration sensor 210 and/or the gyro sensor 220, is within a preset range of value, or the variation, compared with that in the previous period, is within a preset value, the sensor hub 120 may alter the next sensor sampling period. For example, if the sensor hub 120 detects that the degree of movement of the mobile device 100 has been increased more in the current sampling period than in the previous sampling period, the sensor hub 120 decreases the next sensor sampling period to be less than the previous sensor sampling period.

The magneto sensor 230 measures changes in a magnetic field.

The barometer 240 measures changes in atmospheric pressure.

If a value corresponding to the changes in a magnetic field is within a preset range of value or a value corresponding to the changes in atmospheric pressure within a preset range of value, the sensor hub 120 may alter the sensor sampling period.

The proximity-luminance sensor 250 measures luminance in the ambient environment of the mobile device 100, detects whether an object approaches the mobile device 100, based on the measured luminance, and measures the distance to the object from the mobile device 100. If the measured value is within a preset range of value, the sensor hub 120 may alter the sensor sampling period. The proximity-luminance sensor 250 may also transfer the measured luminance to the AP 110.

If the sensor hub 120 transfers the measured luminance and a wake-up signal to the AP 110, the AP 110 performs the operations after the wake-up state, referring to the received luminance. The sensor hub 120 may also transfer luminance, measured via the other sensors other than the proximity-luminance sensors module 250, to the AP 110, when transferring a wake-up signal thereto.

The motion sensor 260 detects the motions surrounding the mobile device 100. For example, the motion sensor 260 may detect a user's gestures. The sensor hub 120 alters the sensor sampling period based on the received, user's gestures.

The RGB sensor 270 detects color information.

The temperature sensor 280 detects temperature surrounding the mobile device 100.

The infrared sensor 290 receives infrared light incident to the mobile device 100.

The sensor hub 120 transfers a wake-up signal to the AP 110 or alters the sensor sampling period, based on the measured values by the sensors of the sensor unit 130.

Figure 3:
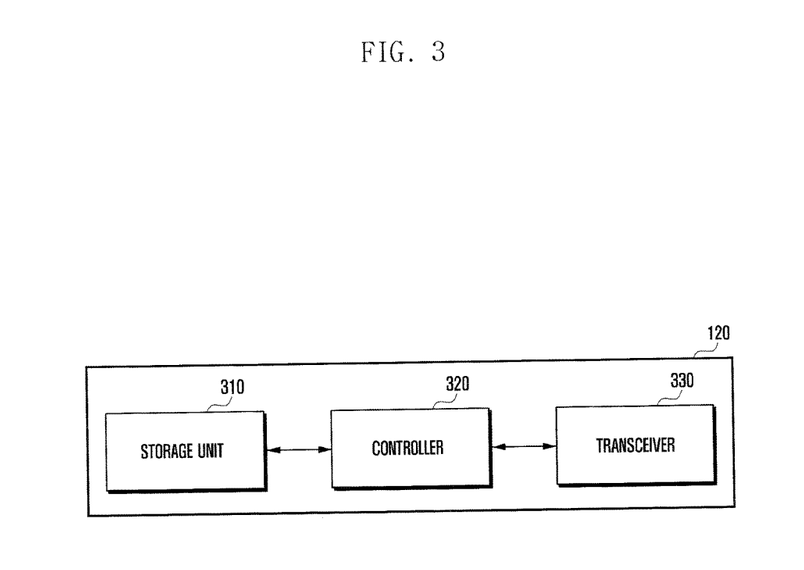
FIG. 3 illustrates a detailed view showing a sensor hub according to an exemplary embodiment of the present invention.

FIG. 3 illustrates a detailed view showing the sensor hub 120 according to an exemplary embodiment of the invention.

Referring to FIG. 3, the sensor hub 120 includes a storage unit 310 for storing data, a controller 320 for controlling the operation of the sensor hub 120, and a transceiver 330 for performing data transmission/reception.

The transceiver 330 transmits and receives data and signals to and from the AP 110 and the sensor unit 130. The transceiver 330 receives a user's inputs or a user's settings, input to the mobile device 100, from the AP 110, and transmits a wake-up signal to the AP 110. The transceiver 330 transmits controls signals to the sensor unit 130 and receives measured values from the sensor unit 130.

The storage unit 310 stores data and measured values from the AP 110 or the sensor unit 130. The storage unit 310 stores information regarding measured values as reference values, used when the sensor hub 120 alters sensor sampling periods. The storage unit 310 also stores a number of sensor sampling periods that can be set to the sensor hub 120.

The controller 320 controls the storage unit 310 and the transceiver 330. The controller 320 sets a sensor sampling period and data to be transmitted to the sensor unit 130 and the AP 110, based on the information stored in the storage unit 310 and values transmitted from the transceiver 330.

Figure 4:
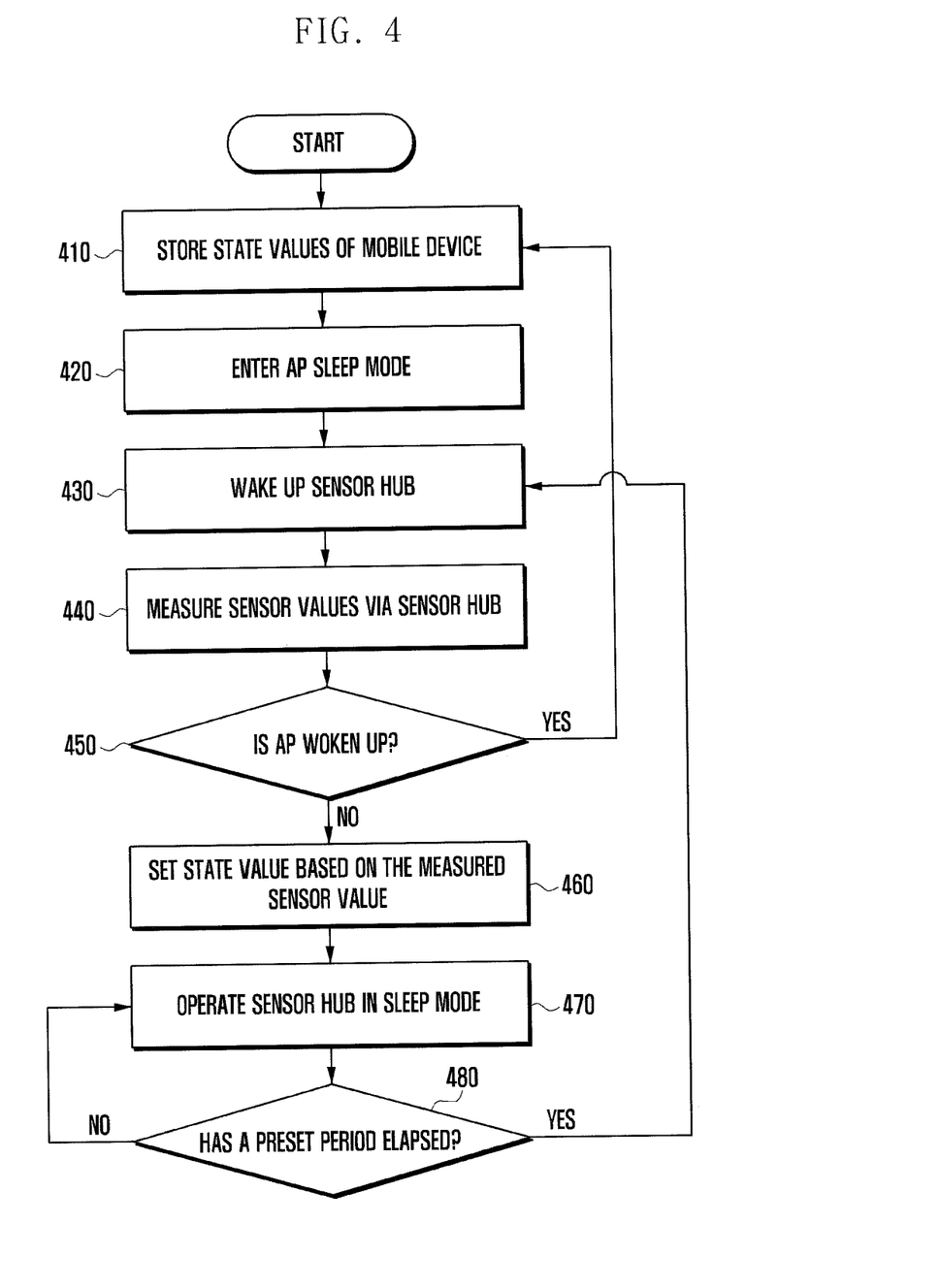
FIG. 4 illustrates a flow chart describing a first exemplary embodiment of a method for operating a mobile device according to an exemplary embodiment of the present invention.

FIG. 4 illustrates a flow chart describing a first exemplary embodiment of a method for operating a mobile device according to an exemplary embodiment of the present invention.

Referring to FIGS. 1 and 4, the sensor hub 120 stores state values of the mobile device 100, which are measured by the sensor unit 130 or received via the AP 110 in step 410. The state values received via the AP 110 may be a user's input values 110 or values transmitted from the other processors including a CP. The sensor hub 120 may receive a user directly input values via the AP 110. The sensor hub 120 may set sensor sampling periods based on the stored state values of the mobile device 100.

The AP 110 enters sleep mode in step 420. Entering sleep mode is executed by one or more cases as follows: if the operations of the mobile device 100 are stopped according to a user's request; if a user's inputs are not created for a relatively long period of time; if a value measured via the sensor unit 130 and received by the sensor hub 120 is within a certain range; and/or if the reduction of power consumption is needed. If the AP 110 enters sleep mode, most operations are not executed in the AP 110, thereby reducing power consumption. During sleep mode, the AP 110 may operate only a module for receiving a wake-up signal in normal mode. When the module receives a wake-up signal, the AP 110 can re-activate the other modules that have been disabled in the sleep mode. If the AP 110 enters sleep mode, the sensor hub 120 may also enter sleep mode.

When the sensor hub 120 is woken up in step 430, the sensor hub 120 controls the sensor unit 130 and receives the measured values from the sensor unit 130 in step 440. The values measured by the sensor unit 130 may be state information regarding the mobile device 100.

The sensor hub 120 determines whether the AP 110 is woken up in step 450. The AP 110 may be woken up via a wake-up signal from the sensor hub 120. Alternatively, the AP 110 may be woken up via a wake-up signal from the components of the mobile device 100, such as the CP. If the sensor hub 120 ascertains that the AP 110 has been woken up at step 450, the sensor hub 120 returns to step 410 where the sensor hub 120 stores state values of the mobile device 100 and performs the following processes.

If the sensor hub 120 ascertains that the AP 110 has not been woken up at step 450, the sensor hub 120 sets a state value based on the measured values of the sensor unit 130, received at step 440, in step 460. The state value may include a period in which the sensor hub 120 receives measured values from the sensor unit 130 during the sleep mode. The period in which the sensor hub 120 receives measured values is called a sensor sampling period. Since the sensor sampling period is set based on the measured values of the sensor unit 130, the sensor sampling period can be selectively adjusted and set according to the surrounding conditions of the mobile device 100. This can reduce electric power consumption in the mobile device 100 and also enhance the response of the mobile device 100.

The sensor hub 120 sets a sensor sampling period according to the measured values of the sensor unit 130. If the user's inputs have not been created frequently in the mobile device 100, based on the number of measured values of the sensor unit 130, the sensor hub 120 may increase the length of a sensor sampling period. If the user's inputs have been created frequently in the mobile device 100, or the variation of the measured values of the sensor unit 130 has been large, the sensor hub 120 may decrease the length of a sensor sampling period.

The sensor hub 120 enters sleep mode in step 470. The sensor hub 120 determines whether the sensor sampling period, set at step 460, has elapsed in step 480. If the sensor hub 120 ascertains that the sensor sampling period has elapsed at step 480, the sensor hub 120 returns to step 430 where the sensor hub 120 is woken up and receives measured values of the sensor unit 130. Otherwise, the sensor hub 120 continues to operate in sleep mode in step 470, thereby reducing power consumption.

Figure 5:
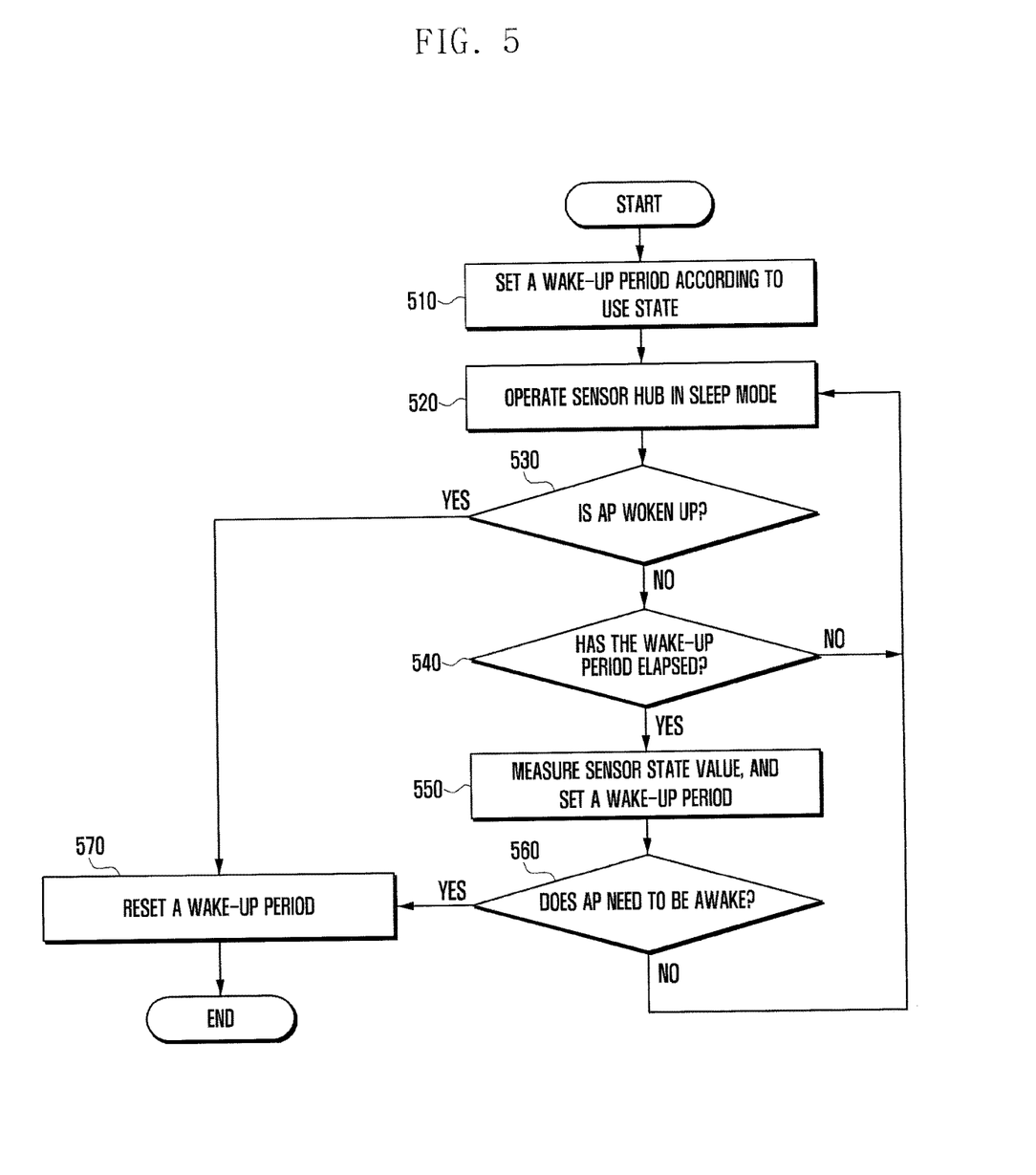
FIG. 5 illustrates a flow chart describing a second exemplary embodiment of a method for operating a mobile device according to an exemplary embodiment of the present invention.

FIG. 5 illustrates a flow chart describing a second exemplary embodiment of a method for operating a mobile device according to an exemplary embodiment of the present invention.

Referring to FIGS. 1 and 5, the sensor hub 120 sets a wake-up period according to the use states of the mobile device 100 in step 510. The use states are based on the user's inputs or measured values of the sensor unit 130. The wake-up period of the sensor hub 120 corresponds to a sampling period of the sensor unit 130, and is thus referred to as a sensor sampling period. If the mobile device is designed to support an alarm function and is set to operate the sleep wake-up function according to a user's input, the sensor hub 120 may set the sensor sampling period to be relatively large. For example, if a sensor sampling period has been set to 20 ms and a wake-up function has been set in the mobile device 100, the sensor hub 120 may set the sensor sampling period to 200 ms. Alternatively, the mobile device 100 may perform a sampling operation more frequently as a preset alarm time approaches. To this end, the sensor sampling period may be re-set to 20 ms. An example of the use state is an alarm time.

The sensor hub 120 enters sleep mode and operates in the mode for the sensor sampling period set at step 510 in step 520. During the sleep mode, the sensor hub 120 executes only an operation for determining whether the sampling period has elapsed, and this minimizes electric power consumption.

The sensor hub 120 determines whether the AP 110 is woken up in step 530. This can be executed via a signal transmitted from the AP 110. The AP 110 transmits a control signal to the sensor hub 120 and operates the sensor hub 120 in a wake-up state.

The AP 110 may be woken up via a user's input signal or/and according to the operation of the CP. The AP 110 may be woken up via a wake-up signal from the sensor hub 120, during the sleep mode. Alternatively, the AP 110 may be woken up via a wake-up signal from the other components of the mobile device 100. For example, the AP 110 may be woken up via a wake-up signal from the CP that executes call-related operations in the mobile device 100. The CP may be enabled while the AP 110 operates in sleep mode. Accordingly, if the mobile device 100 receives a call request from an external system, the CP transfers a wake-up signal to the AP 110.

If the AP 110 is woken up at step 530, the sensor hub 120 re-sets a sensor sampling period based on the wake-up signal from the AP 110 or values that the sensor unit 130 has measured in step 570. When the AP 110 operates in normal mode, the sensor hub 120 receives measured values from the sensor unit 130, stores the measured values, and transfers the measured values to the AP 110.

If the AP 110 is not woken up at step 530, the sensor hub 120 operates in sleep mode until the set, sensor sampling period elapses in step 540.

If the set sensor sampling period has elapsed at step 540, the sensor hub 120 operates in wake-up mode, controls the sensor unit 130, and receives the measured values from one or more sensors of the sensor unit 130 in step 550.

In addition, the sensor hub 120 may re-set a sensor sampling period based on the measured values. If the variation of the measured values is less than or equal to a preset value, the sensor hub 120 may set a sensor sampling period to be relatively large. If the variation of the measured values is greater than or equal to another preset value, the sensor hub 120 may set a sensor sampling period to be relatively small. If the variation of the measured values is within a preset range, the sensor hub 120 may set a sensor sampling period to be the same as the previous sensor sampling period.

After setting a sensor sampling period at step 550, the sensor hub 120 determines whether the sensor hub 120 needs to wake up the AP 110 based on the measured values received at step 550 in step 560. If the measured values are within a preset range or the variation of the measured values is within a preset range, the sensor hub 120 wakes up the AP 110.

If the sensor hub 120 needs to wake up the AP 110 at step 560, the sensor hub 120 transfers a wake-up signal including the measured values to the AP 110. If the AP 110 is woken up, the sensor hub 120 re-sets a sensor sampling period based on the measured values at step 570.

If the sensor hub 120 does not need to wake up the AP at step 560, the sensor hub 120 returns to step 520 where the sensor hub 120 operates in sleep mode for the set, sensor sampling period.

As described above, since the mobile device 100 includes the sensor hub 120 for controlling sensors, the mobile device 100 can control the sensors via the sensor hub irrespective of the operations of the main processor. When the mobile device operates in sleep mode, only the sensor hub 120 is woken up and measures the states via the sensors. As a result, overhead may be reduced. In addition, the sensor hub 120 sets a sensor sampling period based on the received state value of the mobile device 100, e.g., sampling conditions and sampled results, thereby enhancing convenience of the mobile device, and preventing an increase in power consumption, and the decrease of response of the mobile device.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

The terms or words described in the description and the claims should not be limited by a general or lexical meaning, instead should be analyzed as a meaning and a concept through which the inventor defines and describes the invention to the best of his/her ability, to comply with the idea of the invention. Therefore, one skilled in the art will understand that the exemplary embodiments disclosed in the description and configurations illustrated in the drawings are only preferred exemplary embodiments, instead there may be various modifications, alterations, and equivalents thereof to replace the exemplary embodiments at the time of filing this application.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device for controlling a sensor hub and a plurality of sensors, the mobile device comprising:
   a plurality of processors including an application processor and a communication processor;
   a plurality of sensors; and
   a sensor hub,
   wherein the application processor is configured to operate in a wake up state or a sleep state based on a user input and a signal received from the communication processor,
   wherein the sensor hub is configured to:
      receive a measured value from at least one sensor of the plurality of sensors, and
      modify a sensor measurement period of the at least one sensor based on the measured value received from the at least one sensor while the application processor maintains in the sleep state, and
   wherein the at least one sensor remains active while the application processor is in the sleep state.

2. The mobile device of claim 1, wherein the sensor hub is a management module for controlling the at least one of the plurality of sensors.

3. The mobile device of claim 1, wherein the sensor hub is further configured to:
   receive state information regarding to the mobile device from the at least one sensor when the sensor hub is in the wake up state, the state information being obtained by one of the plurality of sensors.

4. The mobile device of claim 1, wherein the sensor hub is further configured to:
   transmit a wake up signal with the measured value to the application processor in response to determining that that the measured value satisfies a predetermined condition.

5. The mobile device of claim 1, wherein the sensor hub is further configured to:
   differently modify the sensor measurement period of each of the plurality of sensors based on the measured value.

6. The mobile device of claim 1, wherein the sensor hub is further configured to:
   receive a wake up signal from the application processor when the application processor is in the wake up state, and
   modify the sensor measurement period based on a status information regarding to the mobile device, the status information included in the wake up signal.

7. The mobile device of claim 6, wherein the sensor hub is further configured to:
   re-modify the sensor measurement period after a predetermined time has elapsed, the predetermined time being determined based on the status information.

8. The mobile device of claim 1, wherein the plurality of sensors include at least one of accelerometer, gyroscope sensor, magnetic sensor, barometer sensor, proximity sensor, motion detection sensor, RGB sensor, temperature sensor, or infrared sensor.

9. A sensor hub for modifying a sensor measurement period, comprising:
   a transceiver configured to receive a measured value from a plurality of sensors, and
   a processor,
   wherein the processor is configured to:
      modify the sensor measurement period of at least one sensor of the plurality of sensors based on the measured value while an application processor remains in a sleep state, at least one sensor of the plurality of sensors remaining active while the application processor maintains in the sleep state.

10. The sensor hub of claim 9, wherein the processor is further configured to:
    differently modify the sensor measurement period of each of the plurality of sensors based on the measured value.

11. The sensor hub of claim 9, wherein the processor is further configured to:
    re-modify the sensor measurement period after a predetermined time has elapsed, the predetermined time being determined based on a status information included in a wake up signal.

12. The sensor hub of claim 9, wherein the plurality of sensors include at least one of accelerometer, gyroscope sensor, magnetic sensor, barometer sensor, proximity sensor, motion detection sensor, RGB sensor, temperature sensor, or infrared sensor.

13. A method for controlling a mobile device with a sensor hub and a plurality of sensors, the method comprising:
    receiving a measured value from the plurality of sensors; and
    modifying a sensor measurement period of at least one sensor of the plurality of sensors based on the measured value while an application processor remains in a sleep state, at least one sensor of the plurality of sensors remaining active while the application processor maintains in the sleep state.

14. The method of claim 13, wherein the receiving of the measured value comprises:
    receiving state information regarding to the mobile device from the plurality of sensors when the sensor hub is in a wake up state, the state information being obtained by at least one sensor of the plurality of sensors.

15. The method of claim 13, further comprising:
transmitting the measured value to the application processor,
wherein the transmitting of the measured value to the application processor comprises:
transmitting a wake up signal with the measured value to the application processor in response to determining that that the measured value satisfies a predetermined condition.

16. The method of claim 13, wherein the method further comprises:
differently modifying the sensor measurement period of each of the plurality of sensors based on the measured value.

17. The method of claim 13, wherein the modifying of the sensor measurement period comprises:
receiving a wake up signal from the application processor when the application processor is in the wake up state; and
re-modifying the sensor measurement period based on a status information regarding to the mobile device, the status information included in the wake up signal.

18. The method of claim 13, wherein the method further comprises:
re-modifying the sensor measurement period after a predetermined time has elapsed, the predetermined time being determined based on a status information included in a wake up signal.

19. The method of claim 13, wherein the sensor hub is a management module for controlling at least one of the plurality of sensors.

20. The method of claim 13, wherein the plurality of sensors include at least one of accelerometer, gyroscope sensor, magnetic sensor, barometer sensor, proximity sensor, motion detection sensor, RGB sensor, temperature sensor, or infrared sensor.

* * * * *